(12) United States Patent
Cerny et al.

(10) Patent No.: US 9,738,453 B2
(45) Date of Patent: Aug. 22, 2017

(54) DEVICE FOR INDICATION AND SETTING OF OPERATING TENSION OF AN ENDLESS CHAIN STRAND

(71) Applicant: Schenck Process s.r.o, Prague—Ruzyne (CZ)

(72) Inventors: Tomas Cerny, Pysely (CZ); Michal Chlebovec, Poprad-Velka (SK)

(73) Assignee: Schenck Process s.r.o., Ruzyne (CZ)

( * ) Notice: Subject to any disclaimer, the term of this patent is extended or adjusted under 35 U.S.C. 154(b) by 0 days.

(21) Appl. No.: 15/073,959

(22) Filed: Mar. 18, 2016

(65) Prior Publication Data

US 2016/0200519 A1    Jul. 14, 2016

Related U.S. Application Data

(63) Continuation of application No. PCT/EP2014/002435, filed on Sep. 9, 2014.

(30) Foreign Application Priority Data

Sep. 18, 2013  (CZ) .................. PUV 2013-28484
Sep. 18, 2013  (CZ) .................. PV 2013-713

(51) Int. Cl.
*B65G 23/44*  (2006.01)
*B65G 43/06*  (2006.01)

(52) U.S. Cl.
CPC ............. *B65G 23/44* (2013.01); *B65G 43/06* (2013.01); *B65G 2812/02099* (2013.01)

(58) Field of Classification Search
CPC ..................................................... B65G 23/44
(Continued)

(56) References Cited

U.S. PATENT DOCUMENTS 4,106,545 A * 8/1978 Kloster .................. B22C 11/08
                                                                164/18
7,117,989 B2 * 10/2006 Weigel .................. B65G 23/44
                                                              198/502.1
(Continued)

FOREIGN PATENT DOCUMENTS

CA       2 673 063        1/2011
CN     201529859 U        7/2010
(Continued)

*Primary Examiner* — Leslie A Nicholson, III
*Assistant Examiner* — Lester Rushin
(74) *Attorney, Agent, or Firm* — Muncy, Geissler, Olds & Lowe, P.C.

(57) ABSTRACT

A device including a chain strand where a contact point of a pivoting arm rests and slides on the chain of the chain strand. The pivoting arm is mounted on the shaft. The pivoting arm is coupled with the source of a compressive force in a form of a weight or a torsion spring. The pivoting arm is coupled with the shaft and therefore with the indicator of tension of the chain strand. The compressive force compensates for the change in resistance and lengthening of the chain when the chain conveyor is running, wherein its chain strand has been pre-tensioned by the basic pre-tensioning force induced by the tensioning device. The co-acting of the pre-tensioning force and the compressive force creates the operating tension which is not only indicated but also optimized by the device of the invention depending on a change in resistance in the chain strand.

12 Claims, 4 Drawing Sheets

(58) Field of Classification Search
USPC .......................... 198/810.04, 813, 814, 815
See application file for complete search history.

(56) References Cited

U.S. PATENT DOCUMENTS

| | | |
|---|---|---|
| 8,485,344 B1 | 7/2013 | Liland |
| 2005/0056527 A1 | 3/2005 | Weigel et al. |
| 2011/0014017 A1* | 1/2011 | Webster ............... B65G 1/0407 414/267 |
| 2013/0288837 A1* | 10/2013 | Tuomikoski ............ F16G 13/07 474/148 |

FOREIGN PATENT DOCUMENTS

| | | |
|---|---|---|
| DE | 1 136 850 B | 9/1962 |
| DE | 2 017 949 A1 | 10/1971 |
| DE | 203 11 436 U1 | 9/2003 |
| GB | 679951 A | 9/1952 |
| GB | 873306 A | 7/1961 |
| JP | 2002-087569 A | 3/2002 |

* cited by examiner

DEVICE FOR INDICATION AND SETTING OF OPERATING TENSION OF AN ENDLESS CHAIN STRAND This nonprovisional application is a continuation of International Application No. PCT/EP2014/002435, which was filed on Sep. 9, 2014, and which claims priority to Czech Patent Application No. PV 2013-713, which was filed in Czech Republic on Sep. 18, 2013, and Czech Patent Application No. PUV 2013-28484, which was filed in Czech Republic on Sep. 18, 2013, and which are both herein incorporated by reference.

BACKGROUND OF THE INVENTION

Field of the Invention

The present invention relates to a device for indication and adjustment of the operating tension of an endless chain strand of a chain conveyor which is equipped with a tensioning device modified for the generation of a pre-tensioning force.

Description of the Background Art

It is known that chain conveyors comprise of a strand of an endless chain which is formed by one, two, or even more chains running in parallel around at least one drive sprocket and trailing wheel. Carriers, such as flights, buckets etc., are attached to the chains. The chains most often lay on runners or run in channels. A chain conveyor comprises a working section and a reversing section, which can be placed one above the other or side by side. The entire working section of the chain conveyor is used for the transport of material, that is the transport section in the area between the feed hopper and the discharge point or discharge chute, or alternatively the entire working section plus a part of the reverse section between the feed hopper and the trailing wheel. Usually one of the sprockets is mounted in such a way that is can slide in the direction of the chain strand while this sprocket is coupled with a tensioning device, preferably a hydraulic cylinder or a screw mechanism. In some cases however, the pre-tensioning force adjusted by the tensioning device can change due to variations in resistance, especially in the case of a sticky transport material which accumulates on the sprockets, which lengthens the distance between them. Other sources of variation and thus the change in the actual operating tension of the chain strand are variable loading, changes in physical properties of the transported material, thermal expansion of the chain and the wear of function parts of the chain conveyor. It is possible to observe the changes in resistance or the change in operating tension in a real time with the necessary sensitivity, and to transmit it in a form of a control signal to the tensioning device. Therefore the tensioning device can be adapted for the immediate re-arrangement into a position generating the currently required pre-tensioning force.

From the document DE 20311436 U1, which corresponds to U.S. Pat. No. 7,117,989, an apparatus for reading the operating tension of an endless chain strand is known, comprising of a pivoting arm which is firmly mounted on a shaft which is pivoted by means of a bearing, arranged in the frame of the chain conveyor, in a direction perpendicular to the direction of the chain strand's movement. Outside the area of the transport section, according to said document, at the trailing wheel in the chain strand, there is arranged a concave section-where the contact point of said pivoting arm, rests and slides on the chain of the aforementioned chain strand. The shaft is coupled with the shaft angular displacement sensor. The signal from the shaft angular displacement sensor is transmitted to the control member, which is connected to the tensioning device fitted with a hydraulic cylinder. The amount of chain bending in the concave section is inversely proportional to the value of the pre-tensioning force. This means, that at higher pre-tensioning forces, the chain is less bent and vice versa. The pivoting arm responds quickly to changes in the chain's bending and even in the control member no delay occurs, and so the tensioning device is able to modify the size of pre-tensioning force according to the given selected algorithm without any time delay.

By means of the described apparatus for reading of the operating tension of the endless chain strand, it is possible, after its coupling with the tensioning device, to optimally fix the size of the actual pre-tensioning force, i.e. the operating tension of the chain strand. However the disadvantage of this particular apparatus is that it is only an indication device, that is to say it is not able by itself to vary the pre-tensioning force.

SUMMARY OF THE INVENTION

It is therefore an object of the invention to provide a device for the indication and adjustment of the operating tension of an endless chain strand of chain conveyor. The device can be equipped with a tensioning device, adapted for the generation of a pre-tensioning force applied in the direction of the chain strand's movement. Outside the area of the transport section of the chain strand, there is arranged a concave section, where the contact point of a pivoting arm, firmly mounted on a shaft, rests and slides on the chain of the chain strand. The shaft pivots inside a bearing, which is firmly connected to the frame of the chain conveyor, in the direction perpendicular to the direction of the chain strand's movement. In an exemplary embodiment, the pivoting arm can be coupled with the source of a compressive force. The compressive force can have a direction which is in principle substantially perpendicular to the tangent to the chain strand at the contact point. The size of compressive force is such, that its components in the chain strand on both sides of the contact point have values corresponding to 2-35% of the size of the pre-tensioning force. The pivoting arm is coupled with the tension indicator of the chain strand.

In an embodiment, the source of the compressive force comprises of a torsion spring which can be at the same time, free fitted on the shaft, while braced between the frame of the chain conveyor and the pivoting arm.

In an embodiment, the source of the compressive force comprises a weight which is direct-coupled with the pivoting arm.

It is especially useful if the source of this compressive force can be adjusted and locked. For this purpose, in the case of the source comprising of a torsion spring, the torsion spring having one end sitting on the pivoting arm while the other end is attached to a locking disc. The locking disc is pivoted in the frame of the chain conveyor and is equipped with a lock for fixing the locking disc with respect to the frame. In the case of the source of the compressive force comprising of a weight, the weight is hinged at the bearing point of a lever, which is fixed to the shaft and equipped with a lock for fixing at the bearing point.

To make the pre-tensioning force data available in a visual form, a tension indicator of the chain strand is used. In case of a mechanical alternative, the tension indicator comprises of a pointer which is attached perpendicularly to the shaft.

Preferably a calibrated scale is arranged at the free end of the pointer, which may be located on the frame of the chain conveyor.

In the case of an electronic alternative, the tension indicator comprises a sensor of angular displacement of the shaft. The sensor is connected to an evaluation circuit connected to a calibrated display.

In the case of a mechanical variant of the indicator, it is possible to receive both the visual and the electrical signal simultaneously. For this purpose, at least one electric sensing element from a group of multiple sensing elements, comprising of position switches, will indicate the position of the pivoting arm. These sensors shall be arranged in such a manner or be of a type that they indicate the complete range of positions of the pivoting arm or working range, and are also arranged in such a manner, or of a type that enables the complete working range of the associated pointer and calibrated scale to be covered.

In an embodiment, an emergency switch, which is adapted for indication of chain strand breakage can be arranged in the action range of the pointer below the calibrated scale.

The device for the indication and adjustment of the operating tension of an endless chain strand of a chain conveyor according to the invention is not structurally or capital intensive, and it has a high utility value as it is not only able to indicate the operating tension as in the embodiment known up to now but it is also able, by application of the compressive force, to control this tension as a result of the variation in resistance over time which are encountered in the chain strand. The device can operate independently, i.e. without connecting to the tensioning devices and can be used especially in case of the application of a mechanical screwed tensioning device. Another advantage of the device according to the invention is, that it eliminates adverse impacts of the so called polygon effect. This becomes clearly evident with chain conveyors, whose sprockets have a number of teeth that are so small, that the rotating force transmission is not constant, and cyclic changes of the chain's length occur even between the constant spacing of the drive sprocket and the trailing wheel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 3:
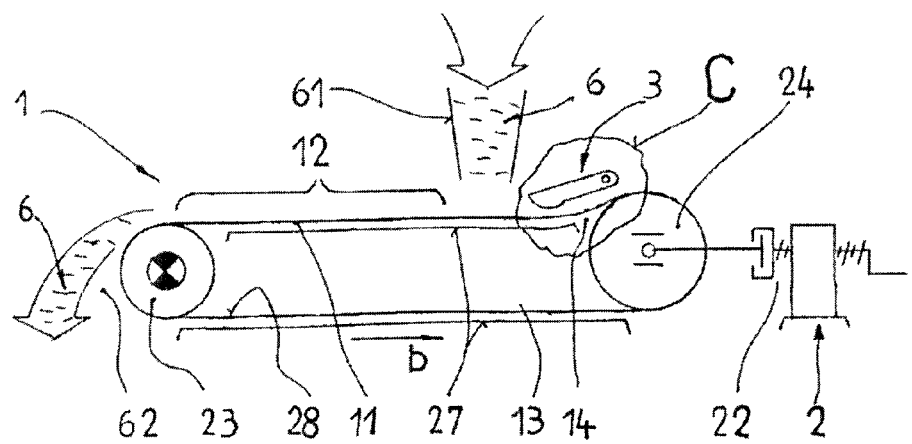
FIG. 3 is a schematic of the straight chain conveyor with a top working section.
Figure 4:
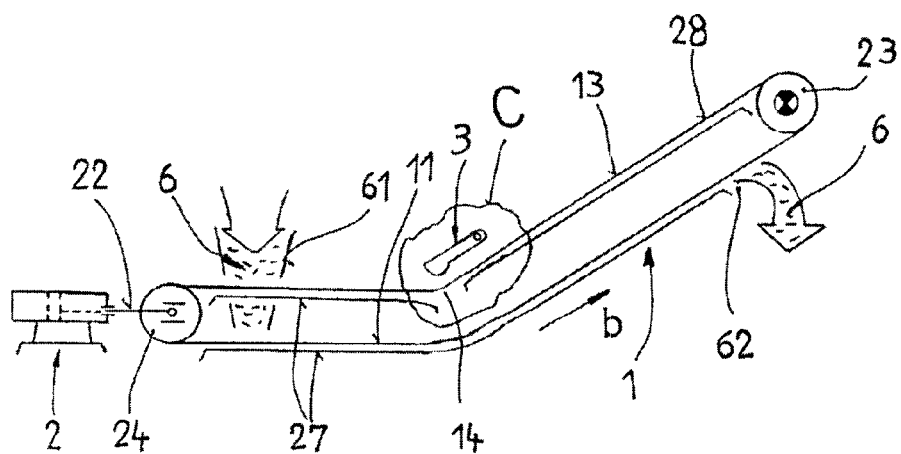
FIG. 4 is a schematic of the cranked chain conveyor with a bottom working section, while in both cases, the device for optimization and indication of the operating tension is shown in the C cut-out.
Figure 8:
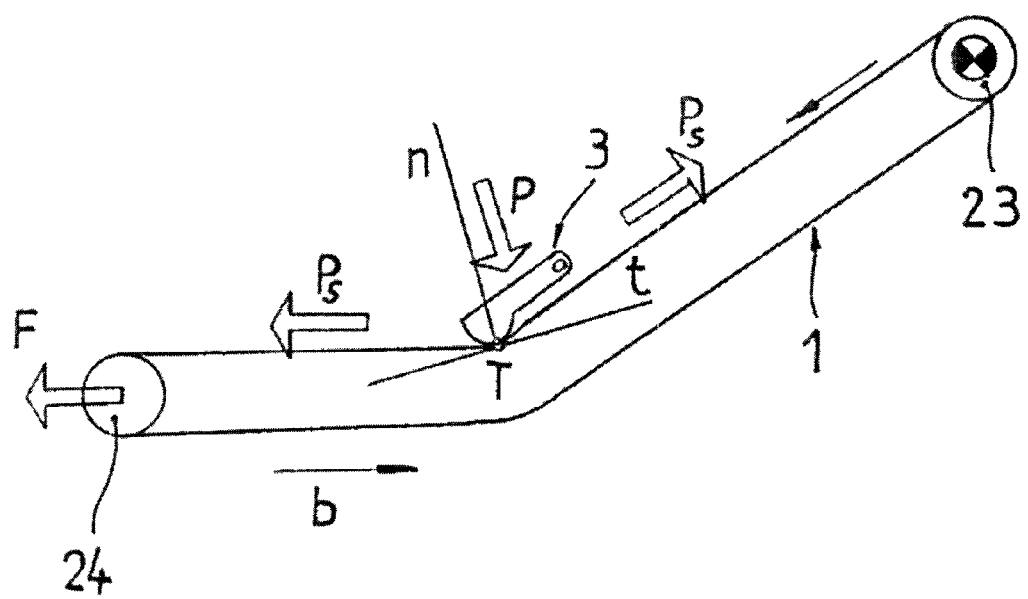
FIG. 8 is schematic of the chain conveyor with the illustrated pre-tensioning and compressive forces.

The chain conveyor 1 with an device according to the invention includes a frame 2 on which at least one drive sprocket 23 and one trailing wheel 24 is pivoted. the trailing wheel 24 is coupled with a tensioning device 22, e.g. of a screw type (FIG. 3) or of a hydraulic type (FIG. 4). The tensioning device 22 is adapted for the generation of a pre-tensioning force F (FIG. 8) which is applied to the chain strand running around the drive sprocket 23 and the trailing wheel 24. The chain strand includes one, two or even more chains arranged in a parallel manner 28. The chains 28 are mounted to slide in the runner 27, which is attached to the frame 2. Carriers (not shown), such as e.g. flights, buckets etc., are attached to the chains 28. The chain conveyor 1 includes a working section 11 and a reverse section 13. The working section 11 can be arranged in the top section of the chain conveyor 1 (FIG. 3) or in its bottom section (FIG. 4). Either the entire working section 11 (FIG. 4) or only its transport section 12 limited by the feed hopper 61 and the discharge point 62 (FIG. 3) is used for the transport of material 6.

Figure 6:
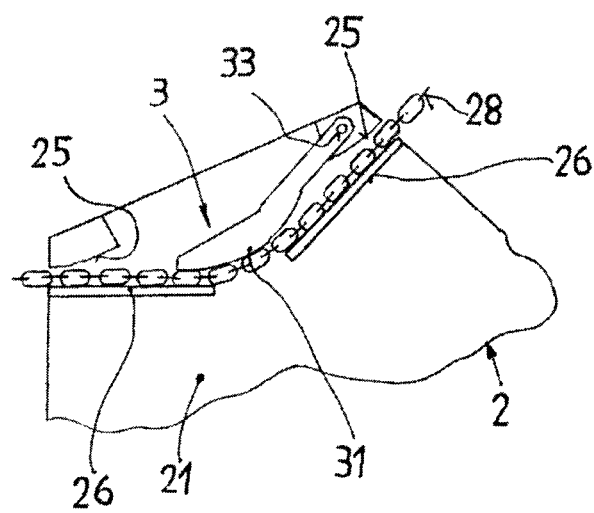
FIG. 6 is a view of the C cut-out with an insufficiently tensioned chain strand or with its breaking.
Figure 7:
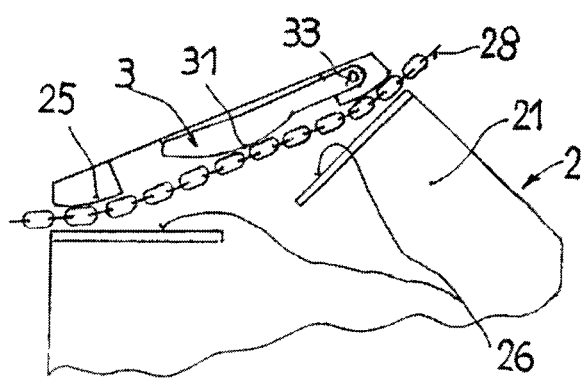
FIG. 7 is a view of the C cut-out with an excessively tensioned chain strand.

Outside the transport section area 12, i.e. in the working section 11 not used for transport or ideally in the reversing branch 13 of the chain strand, there is arranged a concave section 14. In this section, the bottom support 26 which is oriented in an opposing manner and above them the top support 25 (FIG. 1, 2) are attached to the sidewall 21, or sidewalls 21 of the frame respectively 2. The angle formed by the opposing bottom support 26, defines the position of the chain 28 by its loosening or insufficient tensioning (FIG. 6). The angle formed by the top support 25 and at the same time the rounding of top support 25 limits the excessive pre-tensioning of the chain 28 (FIG. 7). In the concave section 14, in the place between the top support 25, the contact point 31 of the pivoting arm 3 slides and rests on the chain 28. The pivoting arm 3 with its fixed point 32 is tightly mounted on the shaft 33. The shaft 33 pivots in the bearing, 34 which is firmly attached to the frame 2 of the chain conveyor 1 in the direction c, perpendicular to the direction b of the movement of the chain strand. The bearing 34, from the spatial point of view, is most appropriately arranged in the sidewall 21 and in the carrier of the top x support 25.

The pivoting arm 3 is coupled to the source 4 of the compressive force P. The compressive force P (FIG. 8) has the direction n, which in principle is perpendicular to the tangent t of the chain strand or of the chain 28 respectively of the contact point T. The compressive force P has such a size that its components $P_S$ in the chain strand on both sides of the contact point T have values corresponding to 2-35% of the size of the pre-tensioning force F.

Figure 2:
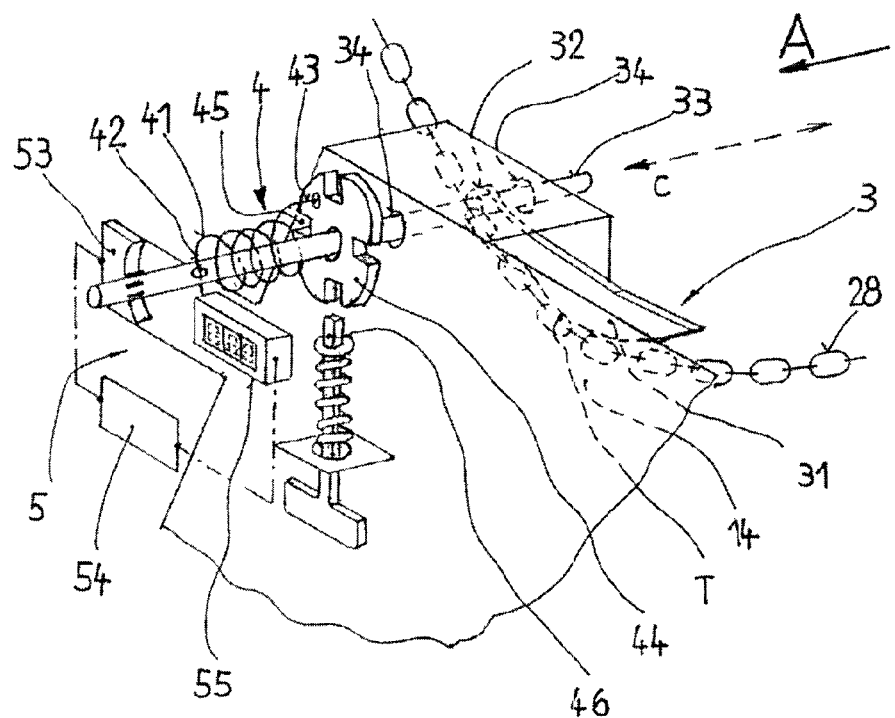
FIG. 2 is the view from the opposite side of the chain conveyor, i.e. the view in B direction from FIG. 1.

In one case, the source 4 of the compressive force P comprises a torsion spring 41 which is at the same time freely fitted on the shaft 33 and braced between the frame 2 of the chain conveyor 1 and the pivoting arm 3. In cases where it is useful to adjust and lock the size of the compressive force P, the torsion spring's 41, one end 42 is coupled with the pivoting arm 3, e.g. by plugging of the end 42 in the shaft 33 while its other end 43 is attached to the locking disc 44. The locking disc 44 is pivoted on the shaft 33 and equipped with a lock for fixing with respect to the frame 2 (FIG. 2). For this purpose, the locking disc 44 is fitted with recesses 45, against these recesses on the sidewall 21, there is arranged a slide mounted spring latch 46 having its rest position in the recesses 45 of the locking disc 44. In the non illustrated alternative when it is not necessary to adjust and lock the compressive force P, the torsion spring 41 is plugged in the shaft 33 at one end 42, identically as in FIG. 2, while the other end 43 is attached to the sidewall 21.

Figure 1:
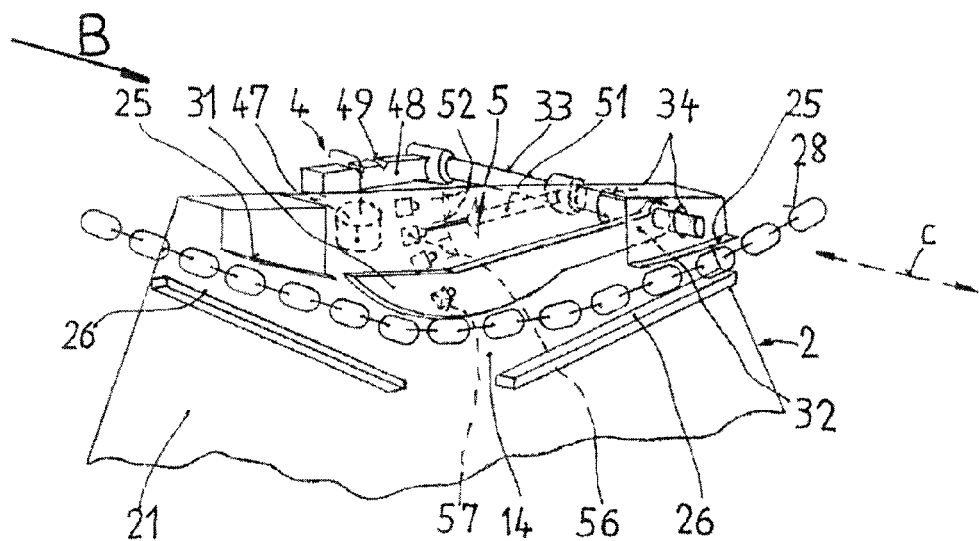
FIG. 1 illustrates the view of the device from the interior of the chain conveyor (view in A direction from FIG. 2)

In another case, the source 4 of the compressive force P comprises a weight 47 which is directly coupled with the pivoting arm 3. The coupling according to the example of embodiment can be carried out so that the lever 48 is firmly connected to the shaft 33, and the weight 47 is hinged on this lever at the bearing point (FIG. 1). For the purpose of re-positioning and locking of the compressive force P, the lever 48 must be fitted with a lock to fix the bearing point. In the non-illustrated case, the lever 48 can be fitted e.g. with a motion screw and the weight can be fitted with an internal thread. In the illustrated example, the cross grooves 49, having the function of bearing points, are situated on the lever 48. The weight 47 is hinged in these grooves 49.

Figure 5:
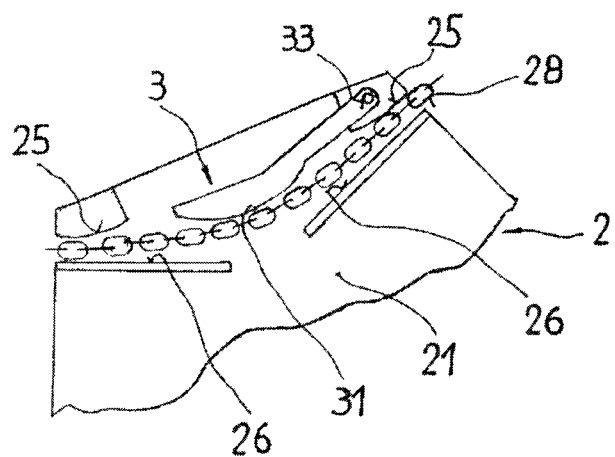
FIG. 5 is a view of the C cut-out with an optimally tensioned chain strand.

The pivoting arm 3 is coupled with the indicator 5 of chain strand tension. In the case of a mechanical variant, the indicator 5 includes a pointer 51 which is attached perpendicularly to the shaft 33 (FIG. 1). Opposite to the free end of the pointer 51 a calibrated scale 52 is arranged on the frame 2 of the chain conveyor 1. The visual indication of the pointer 51 can be complemented with the remote transmission of at least some data. For this purpose, according to the example of the embodiment, position switches 56 are arranged in the action range of the pointer 51 and in the range of a calibrated scale 52. These position switches 56 are adapted for the indication of selected positions of the pivoting arm 3 and especially the position that indicates the optimum tension of the chain 28 (FIG. 5) and positions in which the chain 28 is either insufficiently or excessively tensioned (FIG. 6, 7). In the non-illustrated alternatives, instead of position switches 56, it is also possible to use other types of electric sensing elements, such as sensors adapted for indication of the working range of the pivoting arm 3, or even sensors adapted for continuous measuring of the position of the pivoting arm 3. The embodiment with the position switches 56 is preferably extended by the version in which in the action range of the pointer 51 below the calibrated scale 52, the emergency switch 57 is arranged which is adapted for indication of chain strand breakage.

The electronic variant of the indicator 5 of tension which enables i.a. a continuous remote data transmission includes the sensor 53 of angular displacement of the shaft 33. The sensor 53 of angular displacement is connected to the evaluating circuit 54 which is connected to the calibrated display 55 (FIG. 2).

Prior to starting of the chain conveyor 1 the appropriate pre-tensioning force F (FIG. 8) is applied to the chain strand using the tensioning device 22. This pre-tensioning force F acts in the direction b of the chain strand's movement. Following this activity the chain conveyor 1 will be started. The contact point 31 of the pivoting arm 3 rests and slides on its chain 28, or chains 28, respectively. The compressive force P acts on the pivoting arm 3, which is decomposed to components $P_S$ which will be vector-composed together with the pre-tensioning force F to the final operating tension of the chain strand. Resistance has a variable nature during the operation of the chain conveyor 1. This is caused by the variation of properties of the transported material 6, change in the depth of material layer, unit weight, viscosity etc., or also by changing of the length of the transport section 12 resulting from the displacement of the feed hopper 61 or of the discharge point 62, prolongation or wearing of the chain 28, and also wearing of the functional surfaces of top support 25, bottom support 26, and runners 27. The cyclic changes of resistances also occur in chain conveyors 1 where the polygon effect applies. The pivoting arm 3 responds to these changes in resistance and by means of the compressive force P changes the trajectory of the chain 28 so that, in co-acting with the pre-tensioning force F, the state of the optimum tension is reached. In the case of an optimum tensioning, the chain 28 has the bend shown in FIG. 5 in which it is slack and sits between the top support 25 and bottom support 26 without touching either of them. On the contrary, an insufficiently tensioned chain 28 is so slack that it touches an essential part of bottom support 26 (FIG. 6). In case of an excessive tensioning (FIG. 7), the chain 28 slides on the top support 25. The amount of the slack of the chain 28 is observed by the amount of contact of the pivoting arm 3 which will turn the shaft 33 to the appropriate position. This position is indicated either by the pointer 51 which shows the amount of the actual operating tension of the chain strand on the calibrated scale 52 (FIG. 1), or by the display 55 (FIG. 2) after the preliminary processing of the signal from the sensor 53 of angular displacement of the shaft 33. In case of an electronic variant with the sensor 53 of angular displacement of the shaft 33, but also in case of a mechanical variant with position switches 56, or with the emergency switch 57 as well, or with other types of electric sensing elements, the appropriate signals of the position of the pivoting arm 3, and thus of the size of the operating tension, can be transmitted remotely.

In case of a new adjustment of the pre-tensioning force F, it is possible to change the size of the compressive force P by changing of the position of the weight 47 (FIG. 1), or by changing of the pre-tension of the torsion spring 41 (FIG. 2). This will result in the re-optimization of the operating tension of the endless chain strand. Even after changed conditions of forces, the device indicates the actual operating tension.

The device of the invention can be applied both for one of the chains 28 of the chain strand and also for individual chains 28 separately. However, the best result is achieved, when one pivoting arm 3 rests and slides on each chain 28 where these arms 3 are not mechanically joined to each other. The device can be used for-a chain conveyor 1 without regard to the type of the tensioning device 22.

In most cases, especially with straight chain conveyors 1 gravity will be used to create the concave section 14. The effect of gravity will bend the chain 28 downwards. In extraordinary cases, especially in case of space limitation, the concave section 14 can be bent upwards, too. However, this requires adding another component into the source 4 of compressive force P, which would compensate the weight of the chain 28.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An operating tension indicating and adjustment device for an endless chain strand of a chain conveyor, comprising:
   a tensioning device for generating a pre-tensioning force acting in a first direction of movement of the chain strand;
   a concave section formed in the chain strand next to an area of a transport section; and
   a pivoting arm having a fixed point mounted on a shaft and a contact point sliding on the chain strand, the pivoting arm applying a compressive force to the chain strand;
   wherein the shaft is rotated in a bearing positioned in a frame of the chain conveyor and extends in a second direction substantially perpendicular to the first direction of the movement of the chain strand,
   wherein the pivoting arm is coupled with a tension indicator displaying an operating tension of the chain strand,
   wherein the compressive force has a third direction substantially perpendicular to a tangent of the chain strand at the contact point of the pivoting arm, and
   wherein components of the compressive force on the chain strand on both sides of the contact point take a value of 2-35% of the pre-tensioning force,
   wherein adjustment of the tension indicator between position switches directly adjusts the compressive force on the chain strand.

2. The device according to claim 1, wherein a source of the compressive force comprises a torsion spring freely fitted on the shaft and braced between the frame of the chain conveyor and the pivoting arm.

3. The device according to claim 1, wherein a source of the compressive force comprises a weight that is directly coupled with the pivoting arm.

4. The device according to claim 1, wherein a source of the compressive force is adapted for adjustment and locking.

5. The device according to claim 1, wherein one end of a torsion spring is coupled with the pivoting arm and another end of the torsion spring is attached to a locking disc rotated about the shaft and wherein the device is equipped with a lock to fix the locking disc with respect to the frame.

6. The device according to claim 3, wherein the weight is hinged at a bearing point on a lever; which is rigidly coupled with the shaft.

7. The device according to claim 1, wherein the tension indicator of the chain strand is formed by a pointer fastened substantially perpendicular to the shaft, and wherein a calibrated scale is positioned on the frame of the chain conveyor at a free end of the pointer.

8. The device according to claim 1, wherein the tension indicator includes a shaft angular displacement sensor that is connected to an evaluating circuit connected to a calibrated display.

9. The device according to claim 7, wherein at least one electric sensing element from a group of position switches modified for indication of selected positions of the pivoting arm is arranged in an action range of the pointer in a range of the calibrated scale, and further comprising:
   a sensor adapted for indication of the working range or a sensor adapted for continuous measuring of a position of the pivoting arm.

10. The device according to claim 7, wherein an emergency switch, which is adapted for indication of chain strand breakage, is arranged in an action range of the pointer below the calibrated scale.

11. A chain tension adjustment device for an endless chain strand of a chain conveyor, comprising:
    a first wheel and a second wheel at opposite ends of the endless chain strand, the second wheel driving the endless chain strand of the chain conveyor;
    a pre-tensioning device connected to the first wheel for adjusting pre-tension in the endless chain strand;
    a deflection portion of the chain strand which is deflected by a pivoting arm;
    a shaft, supported by at least two bearings, having a first end and a second end, wherein the first end connects to the pivoting arm and the second end connects to a tension indicator arm;
    at least two position indicators offset from a free end of the tension indicator arm;
    a locking sprocket, substantially centered along the shaft, adapted to engage a locking pin at regular rotational intervals,
    wherein moving the tension indicator arm from a first position indicator of the at least two position indicators to a second position indicator of the at least two position indicators directly adjusts a compressive force applied by the pivoting arm to the chain strand at a contact point in the deflection portion,
    wherein the compressive force is applied perpendicular to a movement direction of the chain strand at the contact point.

12. An operating tension indicating and adjustment device for an endless chain strand of a chain conveyor, comprising:
    a tensioning device for generating a pre-tensioning force acting in a first direction of movement of the chain strand;
    a concave section formed in the chain strand next to an area of a transport section; and
    a pivoting arm having a fixed point mounted on a shaft and a contact point resting and sliding on the chain strand,
    wherein the shaft is pivoted in a bearing positioned in a frame of the chain conveyor and extends in a second direction substantially perpendicular to the first direction of the movement of the chain strand,
    wherein the pivoting arm is coupled with a tension indicator displaying an operating tension of the chain strand,
    wherein the compressive force has a third direction substantially perpendicular to a tangent of the chain strand at the contact point of the pivoting arm,
    wherein components of the compressive force on the chain strand on both sides of the contact point take a value of 2-35% of the pre-tensioning force,
    wherein a source of the compressive force comprises a torsion spring freely fitted on the shaft and braced between the frame of the chain conveyor and the pivoting arm,
    wherein one end of the torsion spring is coupled with the pivoting arm and another end of the torsion spring is attached to a locking disc, which is pivoted on the shaft and equipped with a lock to fix the locking disc with respect to the frame.

* * * * *